United States Patent [19]

Kircher et al.

[11] Patent Number: 4,632,467
[45] Date of Patent: Dec. 30, 1986

[54] BRAKE SYSTEM WITH BRAKE SLIP CONTROL

[75] Inventors: Dieter Kircher; Ivica Batistic, both of Frankfurt am Main, Fed. Rep. of Germany

[73] Assignee: ITT Industries, Inc., New York, N.Y.

[21] Appl. No.: 816,944

[22] Filed: Jan. 6, 1986

Related U.S. Application Data

[63] Continuation of Ser. No. 597,728, Apr. 6, 1984, abandoned.

[30] Foreign Application Priority Data

Apr. 23, 1983 [DE] Fed. Rep. of Germany ....... 3314802

[51] Int. Cl.$^4$ ............................................... B60T 8/10
[52] U.S. Cl. ..................................... 303/111; 303/110
[58] Field of Search ..................... 303/92, 93, 95, 97, 303/102, 103, 105, 110, 111, 119

[56] References Cited

U.S. PATENT DOCUMENTS

| | | | |
|---|---|---|---|
| 3,797,893 | 3/1974 | Burckhardt et al. | 303/111 |
| 4,288,127 | 9/1981 | Leiber et al. | 303/111 |
| 4,491,919 | 1/1985 | Leiber | 303/111 X |
| 4,494,801 | 1/1985 | Ohmari et al. | 303/111 |
| 4,505,520 | 3/1985 | Maehara | 303/119 |

*Primary Examiner*—Duane A. Reger
*Attorney, Agent, or Firm*—James B. Raden; William J. Michals

[57] ABSTRACT

In a brake-slip controlled brake system for automotive vehicles, each one front wheel and one rear wheel are assigned to one joint braking pressure control channel (6, 8; 7, 9). Sensors ($S_1$–$S_4$) for determining the wheel rotational behavior are disposed at all wheels. After their electronic combination and processing, the sensor signals serve to govern braking pressure modulators, e.g. solenoid switching valves (6–9).

In the presence of sufficient friction of the front wheels ($V_R$, $V_L$), brake slip control is dependent on the rotational behavior of the front wheels. In the event of too low friction, brake slip control is switched over to the rear wheels ($H_R$, $H_L$), preferably to the rear wheel having least deceleration which thereby takes the lead as regards the control of the further braking pressure variation.

10 Claims, 1 Drawing Figure

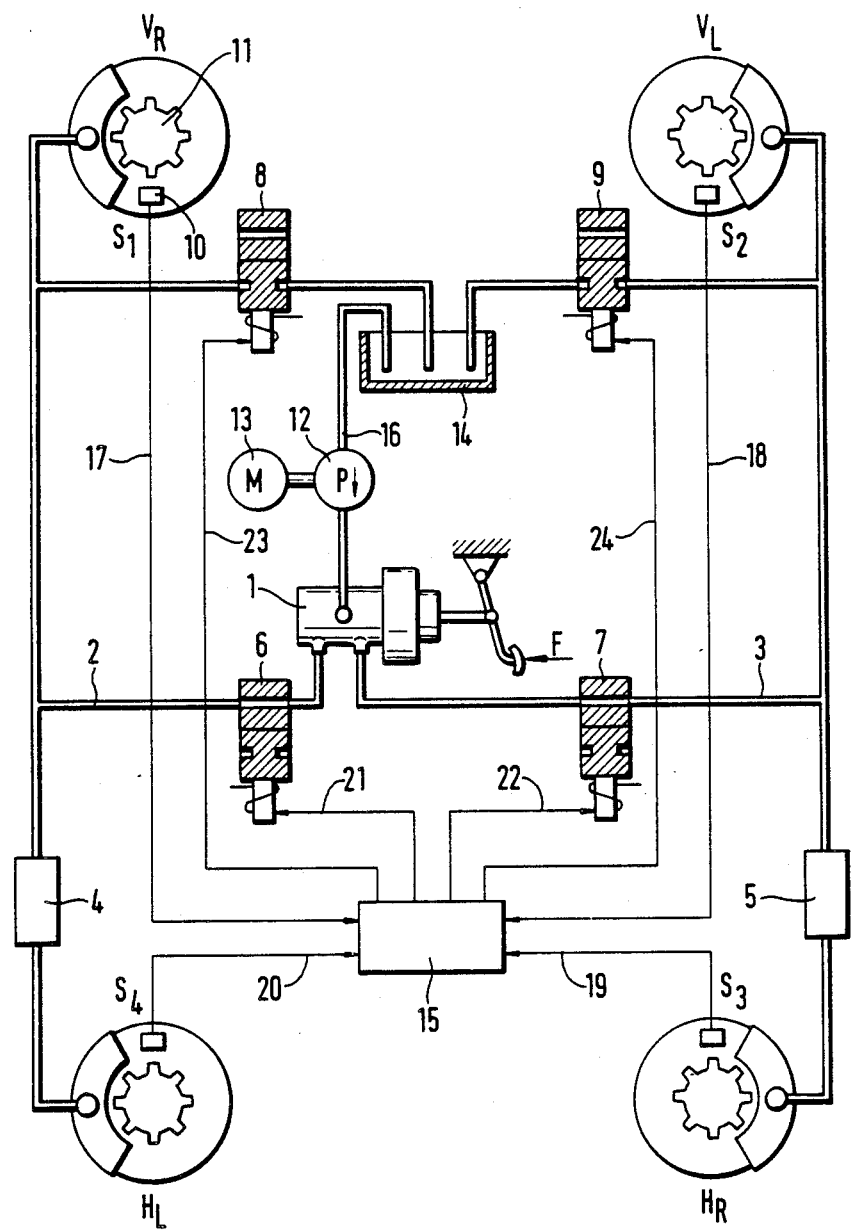

BRAKE SYSTEM WITH BRAKE SLIP CONTROL

This application is a continuation of application Ser. No. 597,728, filed Apr. 6, 1984, now abandoned.

BACKGROUND OF THE INVENTION

The present invention relates to a brake system with brake slip control provided for automotive vehicles, in particular for road vehicles, wherein each one front wheel and one rear wheel are assigned to one joint braking pressure control channel, and wherein the individual wheels and/or the axles are equipped with sensors for the determination of the wheel rotational behavior, the output signals of said sensors serving after their electronic combination and processing to control braking pressure modulators, e.g. solenoid valves.

It is known already for simplification and cost reduction of such brake systems equipped with brake slip control to control not all vehicle wheels individually but to expose for instance the rear wheels to the same amount of braking pressure. In order to avoid locking of both rear wheels in this case nevertheless, according to the "select-low" principle, the wheel at which greatest deceleration occurs will be chosen for dimensioning the braking pressure. It has to be put up with in this respect that the maximum possible exploitation of friction of the second co-controlled wheel will not be attained in the majority of cases—same friction provided on both sides—as a result whereof the stopping distance necessary may become longer.

If, on the other hand, the brake slip control is based on the "select-high" principle of the faster or the less decelerated wheel, this will in some cases have as a consequence too high slip or locking of the co-controlled wheel. Both "select-low" and "select-high" selection principles have specific advantages and shortcomings which appear as a function of road conditions.

Moreover, it is known to depart from the described invariable allocation of wheels to a specific control group for which either "select-low" or "select-high" applies. For example, in a known system the anti-locking system the wheel having worst road contact is determined, its rotational behavior is discounted and all remaining wheels are controlled jointly pursuant to the "select-low" criterion. In the event of a diagonally split-up dual-circuit brake system, with this known system, the circuit corresponding to the wheel that becomes instable first is switched to "select-high", while the other circuit will be switched to "select-low". This method has the disadvantage that under unfavorable conditions, e.g. in the event of icy roads or aquaplaning, when both front wheels tend to lock, there will result an excessive reduction of the braking effect and hence a too long of a stopping distance.

It is therefore an object of the present invention to over these and other disadvantages and to provide a brake system with brake slip control which, despite the restriction to two braking pressure control channels, ensures reliable braking at a shortest possible stopping distance even under unfavorable road conditions i.e., at low friction due to ice or aquaplaning, fresh-fallen snow or the like.

SUMMARY OF THE INVENTION

This object is achieved in an straightforward manner if, in a brake system of the type initially referred to, the brake slip control in the presence of sufficient friction of the front wheels is exclusively dependent on the rotational behavior of the front wheels while, in the presence of too low friction (i.e. in the event of the friction being temporarily or for a specific period below a limit value) the control is dependent upon the rotational behavior of the rear wheels, wherein in both control channels switching over to the rear wheels (i.e. to a dependence of the control upon the rotational behavior of the rear wheels) takes place upon attainment of a predetermined measured value which is defined directly or indirectly by the friction of the front wheels.

The invention brake system bears the advantage that even in situations in which the front wheels are able to contribute but very little to the braking action, effective braking of the vehicle will be guaranteed with the aid of one or both rear wheels.

BRIEF DESCRIPTION OF THE DRAWING

Further features, advantages and applications of the present invention can be gathered from the following description of an embodiment with reference to the accompanying drawing in which the single FIGURE shows a schematically simplified view of a brake system of the inventive type with diagonal allotment of the pressure fluid circuits.

DETAILED DESCRIPTION

According to the embodiment shown, two hydraulic pressure fluid circuits 2 and 3 are connected to a tandem master cylinder 1 of known design. As a diagonal brake circuit split-up is chosen in this arrangement, the brake circuit 2 leads directly to the symbolically indicated right front wheel $V_R$ and leads also to the left rear wheel $H_L$ via a brake force distributor which serves as a pressure reducer 4 when there is a specific axle load distribution. In the same fashion, the pressure fluid circuit 3 is connected directly to the left front wheel $V_L$ and via the pressure reducer 5 to the right rear wheel $H_R$. Said pressure reducers 4, 5 adapt in a known manner the sharing of the braking pressure between the front and the rear wheel to the static and dynamic axle load distribution which is dependent on the vehicle velocity, the braking pressure and other parameters. The inventive brake system permits in many cases to obviate the need for pressure reducers in the pressure fluid line leading to the rear wheel because, under the conditions described, changing over will take place such that the rear wheels or the sensed rotational behavior of the rear wheels, respectively, take charge of controlling the brake slip control instead of the front wheels.

In the embodiment of the invention illustrated herein, electromagnetically actuatable valves 6 through 19 serve as pressure fluid modulators, which valves will only be excited in a specific sequence and thereby switched over upon the commencement of the brake slip control. In the de-energized state, the two inlet valves 6, 7 are opened, while the outlet valves 8, 9 are closed.

Furthermore, the illustration shows the sensors $S_1$ through $S_4$ individually assigned to each wheel, the said sensors possessing each one inductive transducer 10 in which, with the toothed rim 11 rotating, a voltage will be induced dependent on the tooth pitch and the velocity of the wheel. The output signals of the sensors $S_1$ through $S_4$ will be combined logically and prepared in an electronic circuitry 15 and evaluated to form signals for the control of the braking pressure modulators, e.g.

of the solenoid valves 6 through 9. The signal lines leading from the sensors $S_1$ through $S_4$ to the electronic circuitry 15 are denoted by reference numerals 17 through 20, while the control lines leading from the circuitry 15 to the solenoid valves 6 through 9 are denoted by reference numerals 21 through 24.

Moreover, there is symbolic representation in the drawing of a pump 12 which is driven by the electric motor 13 and which serves as an energy source for the tandem master cylinder 1 which latter is designed as a component of a hydraulic power brake booster in this arrangement. The intake 16 to the pump 12 and the outlet valves 8, 9 necessary for the reduction of the braking pressure communicate with a pressure compensating reservoir or pressure fluid reservoir 14.

The mode of function of the brake system illustrated is as follows:

Upon depression of the brake pedal, i.e. upon application of the force F on the symbolically illustrated brake pedal at the inlet of the power brake booster 1, braking pressure is built up in the two diagonal brake circuits 2, 3 and thus in the wheel cylinders of the four vehicle wheels. When the brake slip control sets in, the solenoid valves 6 through 9 are switched to achieve the braking pressure variation desired, one inlet valve and one outlet valve 6, 8 and 7, 9, respectively, thereof being allotted to a hydraulic brake circuit 2 and 3, respectively, and forming each one braking pressure control channel. Energization of the inlet valves 6, 7 allows to stop further pressure rise, while energization of the outlet valves 8, 9 permits to establish a connection of the pressure fluid circuit to the compensating reservoir 14 subject to atmospheric pressure, and thereby enables decrease of the braking pressure. Since only two control channels 6, 8, and 7, 9 exist in the inventive brake system, a pressure variation in the brake cylinder of the front wheel takes to same effect on the braking pressure in the associated, e.g. diagonal, rear wheel. It will be ensured by appropriately dimensioning the brake system or by additionally inserting pressure reducers into the brake fluid path to the rear wheel that, in the majority of cases, the front wheel tends to lock before the rear wheel does, whereupon the brake slip control will react and prevent further braking pressure rise by energization of the solenoid valves 6 through 9 or bring about reduction of the braking pressure and thus counteract the imminent locked condition.

That is to say, the brake slip control is directed first by the front wheels or, respectively, by the signals supplied by the sensors $S_1$ and $S_2$. If, however, the friction of the front wheels becomes too low what will be recognized by rise of the brake slip in excess of a predetermined threshold value, by decline of the controlled braking pressure at the front wheels or by continuation of the tendency to lock or even of the locked condition beyond a specific period of time, the brake slip control will be inventively switched over to act in response to the rear wheels. An insufficient amount of friction may likewise be recognized by the deceleration measuring values and/or by the re-acceleration measuring values. Now the rear wheels or—according to a preferred embodiment—the rear wheels having the least deceleration will take over the command of the brake slip control and thus of the braking pressure variation, as a result whereof it will be avoided that the braking effect of the vehicle will be cancelled under extreme conditions, for instance, in the event of aquaplaning. It may occur that all wheels apart from the rear wheel in command will lock completely.

Switching over of the brake slip control to the rear axle or to that rear wheel at which least deceleration is sensed is maintained until termination of the braking action. However, it is likewise possible after a predetermined period of time or in dependence on the further brake slip variation to initiate the switching back to the command in response to the rotational behavior of the front wheels.

What is claimed is:

1. A brake system with brake slip control for automotive vehicles comprising one front wheel and one rear wheel assigned to one joint braking pressure control channel; each individual wheel being equipped with a sensor for determination of the wheel rotational behaviour, said sensor generating output signals being electronically combined and processed to control braking pressure modulators; said modulators regulating a hydraulic fluid flow through a pair of control channels; two fluid circuits diagonally connected via correlated control channels; said channels rerouting the fluid flow from front wheel brakes to vehicle rear wheel brakes when road traction at the front wheels decreases below a predetermined level for a specified period of time wherein the brake slip control is solely dependent upon the rotational behaviour of the rear wheels when said road traction at said front wheels decreases below said predetermined level for said specified period of time and wherein the brake slip control is solely dependent upon the rotational behavior of the front wheels when the road traction at the front wheels exceeds a predetermined level.

2. A brake system as claimed in claim 1, wherein said modulators include means for switching a supply of fluid flow to one of rear wheels having the lowest deceleration when friction at the front wheels decreases below a predetermined level.

3. A brake system as claimed in claim 1, wherein the braking pressure control channel with a higher brake slip in its front wheel includes means providing more pressure to the rear wheel assigned to this control channel when both front wheels experience significantly decreased road traction.

4. A brake system as claimed in claim 1, wherein both control channels have means for rerouting brake fluid flow to the rear wheels when another front wheel experiences a brake slip above a predetermined level.

5. A brake system as claimed in claim 1, wherein sensor means ascertain the brake slip at the front wheels as a measured variable for determining a coefficient of friction and for initiating the fluid pressure switching action.

6. A brake system as claimed in claim 1, wherein sensor means ascertain braking pressure in brake cylinders of the front wheels which corresponds with a coefficient of friction for initiating the fluid flow switching action.

7. A brake system as claimed in claim 1, wherein means for maintaining of the fluid flow switch until termination of the braking operation.

8. A brake system as claimed in claim 1, and means for maintaining the fluid flow rerouting within a predetermined range of acceleration levels.

9. A brake system as claimed in claim 1, wherein said control channel initiate fluid pressure rerouting to rear wheels when the front wheel traction exceeds a predetermined time interval.

10. A brake system as claimed in claim 1, wherein one pressure reducer is inserted into the pressure fluid path to the rear wheel and operation of said reducer being controllable in connection with an axle load distribution.

* * * * *